(12) United States Patent
Doukai

(10) Patent No.: US 7,120,357 B2
(45) Date of Patent: Oct. 10, 2006

(54) WDM DEVICE, CLIENT DEVICE, NETWORK, SYSTEM AND METHOD FOR ALLOCATING WAVELENGTH OF WDM TO A CLIENT SIGNAL

(75) Inventor: Masami Doukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 686 days.

(21) Appl. No.: 10/261,580

(22) Filed: Oct. 2, 2002

(65) Prior Publication Data

US 2004/0208502 A1    Oct. 21, 2004

(30) Foreign Application Priority Data

Mar. 14, 2002   (JP) ............... 2002-070515

(51) Int. Cl.
*H04B 10/08* (2006.01)
*H04B 10/24* (2006.01)
*H04B 10/20* (2006.01)
*H04J 14/00* (2006.01)
*H04J 14/02* (2006.01)

(52) U.S. Cl. ............... 398/43; 398/42; 398/49; 398/58; 398/30; 398/33; 398/79

(58) Field of Classification Search .......... 398/79, 398/41–59, 25, 30, 31, 33
See application file for complete search history.

(56) References Cited

U.S. PATENT DOCUMENTS 6,111,673 A * 8/2000 Chang et al. .......... 398/79
6,701,088 B1 * 3/2004 Watanabe et al. ........ 398/51
2002/0018261 A1 * 2/2002 Takeguchi et al. ....... 359/124
2003/0020991 A1 * 1/2003 Chang .................. 359/168

FOREIGN PATENT DOCUMENTS

| JP | 05-145591 | 6/1993 |
| JP | 11-098141 | 4/1999 |
| JP | 11-331267 | 11/1999 |
| JP | 2000-224145 | 8/2000 |
| JP | 2001-111528 | 4/2001 |

OTHER PUBLICATIONS

Japanese Office Action of Application No. 2002-070515 mailed Jul. 19, 2005.

* cited by examiner

*Primary Examiner*—M. R. Sedighian
(74) *Attorney, Agent, or Firm*—Staas & Halsey LLP

(57) ABSTRACT

A WDM (Wavelength Divisional Multiplex) device is provided in which a client signal having a band that is greater than a band of a wavelength used for wavelength-division multiplexing is allocated a plurality of wavelengths and is transmitted as a wavelength-division multiplexed signal. The WDM device includes a used-band detecting part for detecting a used-band that is used by the client signal supplied from a client device. The used-band is detected from a path layer of the client signal using set-up information contained in the path layer of the client signal. The WDM device also includes a mapping part for mapping the detected used-band onto wavelengths used for wavelength-division multiplexing.

16 Claims, 19 Drawing Sheets

FIG.7A

WDM70

| DEVICE ID | |
|---|---|
| WDM LINE ID 1 | WAVELENGTH BAND |
| | NUMBER OF WAVELENGTHS |
| | WAVELENGTH 1···WAVELENGTH m |
| | WAVELENGTH IN-USE FLAG 1··· WAVELENGTH IN-USE FLAG I |

WDM72

| DEVICE ID | |
|---|---|
| WDM LINE ID 1 | WAVELENGTH BAND |
| | NUMBER OF WAVELENGTHS |
| | WAVELENGTH 1···WAVELENGTH i |
| | WAVELENGTH IN-USE FLAG 1··· WAVELENGTH IN-USE FLAG i |

FIG.7B

WDM70

| SONET LINE 1 | LINE BAND |
|---|---|
| | NUMBER OF DIVIDED WAVELENGTHS |
| | DIVIDED WAVELENGTH IN-USE FLAG 1··· DIVIDED WAVELENGTH IN-USE FLAG m |

WDM72

| SONET LINE 1 | LINE BAND |
|---|---|
| | NUMBER OF DIVIDED WAVELENGTHS |
| | DIVIDED WAVELENGTH IN-USE FLAG 1··· DIVIDED WAVELENGTH IN-USE FLAG j |

FIG.19

| | 1 | 2 | 3 | ... | 192 | 193 | 194 | 195 | ... | 384 | 385 | 386 | 387 | ... | 576 | 577 | 578 579 580 | 581 582 ... 17279 17280 |
|---|---|---|---|---|---|---|---|---|---|---|---|---|---|---|---|---|---|---|
| ROW1 | A1 | A1 | A1 | ... | A1 | A2 | A2 | A2 | ... | A2 | J0 | Z0 | Z0 | ... | Z0 | J1 | Fixed Stuff | STS Path Payload |
| ROW2 | B1 | | | | | E1 | | | | | F1 | | | | | B3 | | |
| ROW3 | D1 | | | | | D2 | | | | | D3 | | | | | C2 | | |
| ROW4 | H1 | H1 | H1 | ... | H1 | H2 | H2 | H2 | ... | H2 | H3 | H3 | H3 | ... | H3 | G1 | | |
| ROW5 | B2 | B2 | B2 | ... | B2 | K1 | | | | | B2 | | | | | F2 | | |
| ROW6 | D4 | | | | | D5 | | | | | D6 | | | | | H4 | | |
| ROW7 | D7 | | | | | D8 | | | | | D9 | | | | | Z3 | | |
| ROW8 | D10 | | | | | D11 | | | | | D12 | | | | | Z4 | | |
| ROW9 | S1 | Z1 | Z1 | ... | Z1 | Z2 | Z2 | M1 | | | E2 | | | | | Z5 | | |

WDM DEVICE, CLIENT DEVICE, NETWORK, SYSTEM AND METHOD FOR ALLOCATING WAVELENGTH OF WDM TO A CLIENT SIGNAL

BACKGROUND OF THE INVENTION

1. Field of the Invention

The present invention relates to a WDM device and a client device, and particularly relates to a WDM device, a client device, a system and a method for allocating wavelengths to a client signal.

2. Description of the Related Art

There are various techniques for transmitting client signals, such as SONET (Synchronous Optical Network), SDH (Synchronous Digital Hierarchy) and GbE (Giga-bit Ethernet) signals, via a WDM (Wavelength Division Multiplexing) network. Client signals can be mapped onto wavelengths for the WDM network in accordance with one of the schemes described below. It is to be noted that a connection rate (line band) of client signals is provisioned when installing additional client signal lines and the wavelengths are reserved corresponding to the line band of the client signals.

In a first mapping scheme, a single client signal is allocated a single wavelength. As shown in FIG. 1, an input client signal is supplied to a signal converting part 10. In the signal converting part 10, the input signal remains in its original format or is converted into a Digital Wrapper format or a format conforming to a wrapping technique defined by ITU-T G.709. The converted signal is transmitted on a wavelength that is unique within a WDM line 13. A multiplexer/demultiplexer (MUX/DEMUX) 12 multiplexes the plurality of wavelengths corresponding to a plurality of client signals to produce a wavelength-division multiplexed signal and transmits the wavelength-division multiplexed signal on the WDM line 13.

A multiplexer/demultiplexer (MUX/DEMUX) 14 demultiplexes the wavelength-division multiplexed signal from the WDM line 13 into a plurality of wavelengths, each of which corresponding to a single client signal. An inverse conversion is carried out in a signal converting part 16. The inverse conversion is an inverse of the conversion carried out at the signal converting part 10 of the sending side (i.e., to the original format, or, if Digital Wrapper format is used, the Digital Wrapper format is unformatted). The inverse converted signal is transmitted in the format of the original client signal.

In a second mapping scheme, a plurality of client signals is allocated a single wavelength. The second mapping scheme applies when the band of a client signal is sufficiently narrower than the band of a wavelength in the WDM network. As shown in FIG. 2, input client signals are supplied to a signal converting part 20 where the input client signals are time-division multiplexed or converted into a Digital Wrapper format or a format conforming to a wrapping technique defined by ITU-T G.709. The converted signal is allocated to a wavelength that is unique within the WDM line. A multiplexer 22 multiplexes the plurality of wavelengths corresponding to the converted signal to produce a wavelength-division multiplexed signal and transmits the wavelength-division multiplexed signal on the WDM line 23.

A multiplexer/demultiplexer (MUX/DEMUX) 24 demultiplexes the multiplexed signal from the WDM line 23 into a plurality of wavelengths. An inverse conversion is carried out in the signal converting part 26. The inverse conversion is an inverse of the conversion performed at the signal converting part 20 of the sending side (i.e., the time-division multiplexed signal is time-division demultiplexed, or, if Digital Wrapper format is used, the Digital Wrapper format is unformatted). The inverse converted signals are transmitted in a format of the original client signals.

In a third mapping scheme, a single client signal is allocated a plurality of wavelengths. The third mapping scheme applies when the band of a client signal is sufficiently broader than the band of a wavelength of the WDM network. As shown in FIG. 3, an input client signal is supplied to a signal converting part 30. In the signal converting part 30, the input client signal remains in its original format or is converted into a Digital Wrapper format or a format conforming to a wrapping technique defined by ITU-T G.709. In the signal converting part 30, the converted input client signal is further divided. The divided and converted signals are allocated a plurality of wavelengths that are unique within the WDM line. A multiplexer/demultiplexer (MUX/DEMUX) 32 multiplexes the plurality of wavelengths to produce a wavelength-division multiplexed signal and transmits the wavelength-division multiplexed signal on the WDM line 33.

A multiplexer/demultiplexer (MUX/DEMUX) 34 demultiplexes the wavelength-division multiplexed signal from the WDM line 33 into a plurality of wavelengths. An inverse conversion is carried out in the signal converting part 36. The inverse conversion is an inverse of the conversion performed at the signal converting part 30 of the sending side (i.e., the original format is left as it is, or, if Digital Wrapper format is used, the Digital Wrapper format is unformatted). The inverse conversion is carried out while synchronizing signals of each wavelength. The inverse converted signal is transmitted with a format of the original client signal.

FIG. 4 is a block diagram showing an example of a signal converting part of the related art. The signal converting part shown in FIG. 4 corresponds to the signal converting parts 10 and 16. In FIG. 4, a SONET/SDH client signal is received at a signal receiving part 40. A wrapping process part 41 converts the received signal into a Digital Wrapper format or a format conforming to a wrapping technique defined by ITU-T G.709. Then, in a wavelength allocating part 42, the converted signal is allocated a wavelength that is unique within a WDM line and then supplied to the multiplexer/demultiplexer 12 on the WDM line side.

On the other hand, a signal receiving part 45 receives signals that have been demultiplexed in the multiplexer/demultiplexer 14 of the WDM line side. The received signals undergo an unwrapping process (a conversion that is an inverse of the transform performed at the wrapping process part 41) in an unwrapping process part 46. Then, the signals are output from a SONET/SDH signal process part 47 as client signals of a SONET/SDH type.

Recent technical innovation provides an ever increasing capacity of a client signal (e.g. 40 Gbps) and an ever increasing capacity of a WDM line (increased number of wavelengths and increased capacity per wavelengths). However, since the rate of increase of the capacity of a wavelength of the WEM line is less than the rate of increase of the capacity of the client signal, a plurality of wavelengths will be allocated to a single client signal having a large capacity. As a result, the number of client signals that can be accommodated in the WDM line becomes less.

For example, when a client signal (OC768) of a SONET type with a line capacity of 40 Gbps is connected to the signal converting part 30 shown in FIG. 1, four 10.7 Gbps-wavelengths are allocated for transmitting all of the 40

Gbps capacity. However, when only two 10 Gbps SONET paths (OC192c) are actually used in the client signal line of 40 Gbps, only two of the allocated 10.7 Gbps-wavelengths are used and the remaining two wavelengths will be unused. The unused allocated wavelengths cannot be used for other lines. Therefore, there is a problem that wavelengths in the WDM line are not used in an efficient manner.

SUMMARY OF THE INVENTION

Accordingly, it is a general object of the present invention to provide a WDM device, a client device, a network, a system and a method that can obviate the problem described above.

It is another and more specific object of the present invention to provide a WDM device, a client device, a network, a system and a method that can minimize the ratio of used bands against available wavelengths and can make efficient use of the wavelengths in the WDM line.

In order to achieve the above objects, according to the present invention, a WDM (Wavelength Divisional Multiplex) device wherein a client signal having a band that is greater than the band of a wavelength used for wavelength-division multiplexing is allocated a plurality of wavelengths and is transmitted as a wavelength-division multiplexed signal includes:

a used-band detecting part for detecting a used-band that is used by a client signal supplied from a client device, the used-band being detected from a path layer of the client signal using set-up information contained in the path layer of the client signal; and a mapping part for mapping the detected used-band onto wavelengths used for wavelength-division multiplexing.

With the WDM device described above, the ratio of the used bands against the wavelengths can be optimized (minimized) and the number of wavelengths of the WDM line can be used in an efficient manner.

Further, according to the present invention, a WDM device is provided that includes a signal restoring part for synchronizing a plurality of wavelengths separated from a received wavelength-division multiplexed signal and restoring said wavelength-division multiplexed signal into a path layer of the original client signal.

With the invention described above, the original client signal can be restored.

The present invention also relates to a client device, a network, a system and a method for achieving the above objects.

BRIEF DESCRIPTION OF THE DRAWINGS

FIG. 7A is a diagram used for explaining a provisioning operation of the WDM device according to the present invention.

FIG. 7B is another diagram used for explaining a provisioning operation of the WDM device according to the present invention.

FIG. 19 is a diagram showing an example of a frame format conforming to SONET.

DETAILED DESCRIPTION OF THE PREFERRED EMBODIMENTS

In the following, principles and embodiments of the present invention will be described with reference to the accompanying drawings.

In order to transmit client signals on a WDM line, the client signals that are provisioned using TL-1 (Transactional Language 1) are mapped onto wavelengths of the WDM line. In the related art, such mapping is based on a line band of the client signals. In accordance with the present invention, mapping is based on bands-in-use, that is to say, PATH layer bands of SONET/SDH that are actually provisioned and used.

Figure 1:
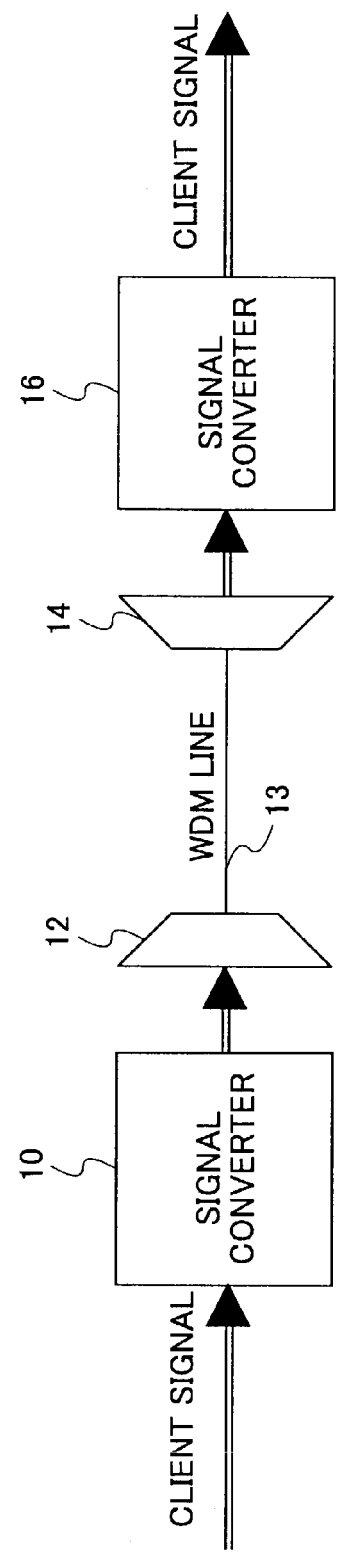
FIG. 1 is a diagram showing an example of a WDM system in which a single wavelength is allocated to a single client signal.
Figure 2:
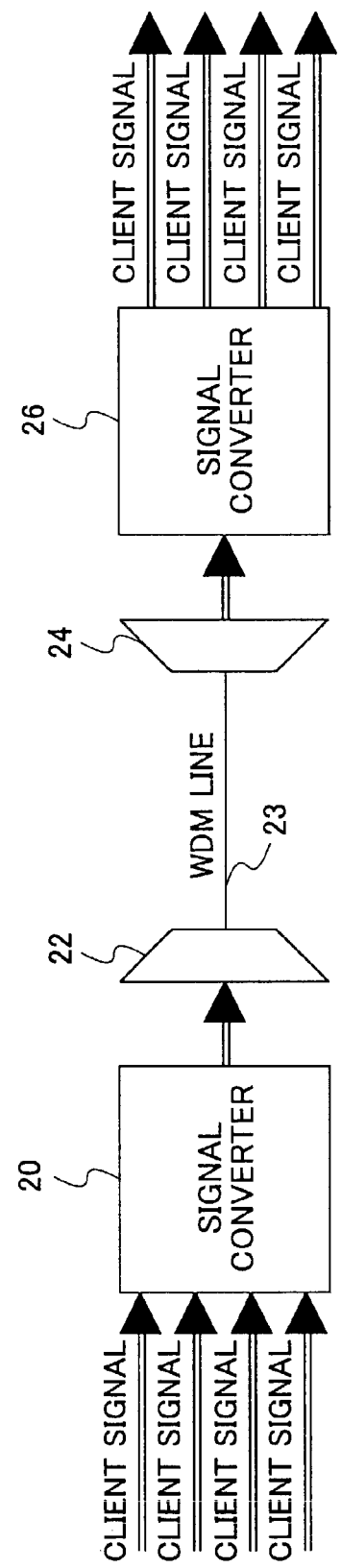
FIG. 2 is a diagram showing an example of a WDM system in which a single wavelength is allocated to a plurality of client signals.
Figure 3:
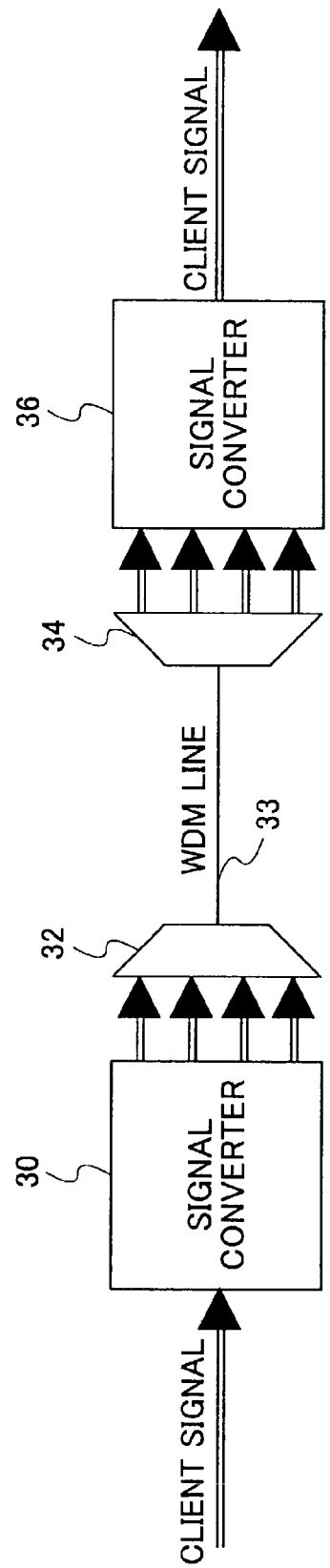
FIG. 3 is a diagram showing an example of a WDM system in which a plurality of wavelengths is allocated to a single client signal.
Figure 4:
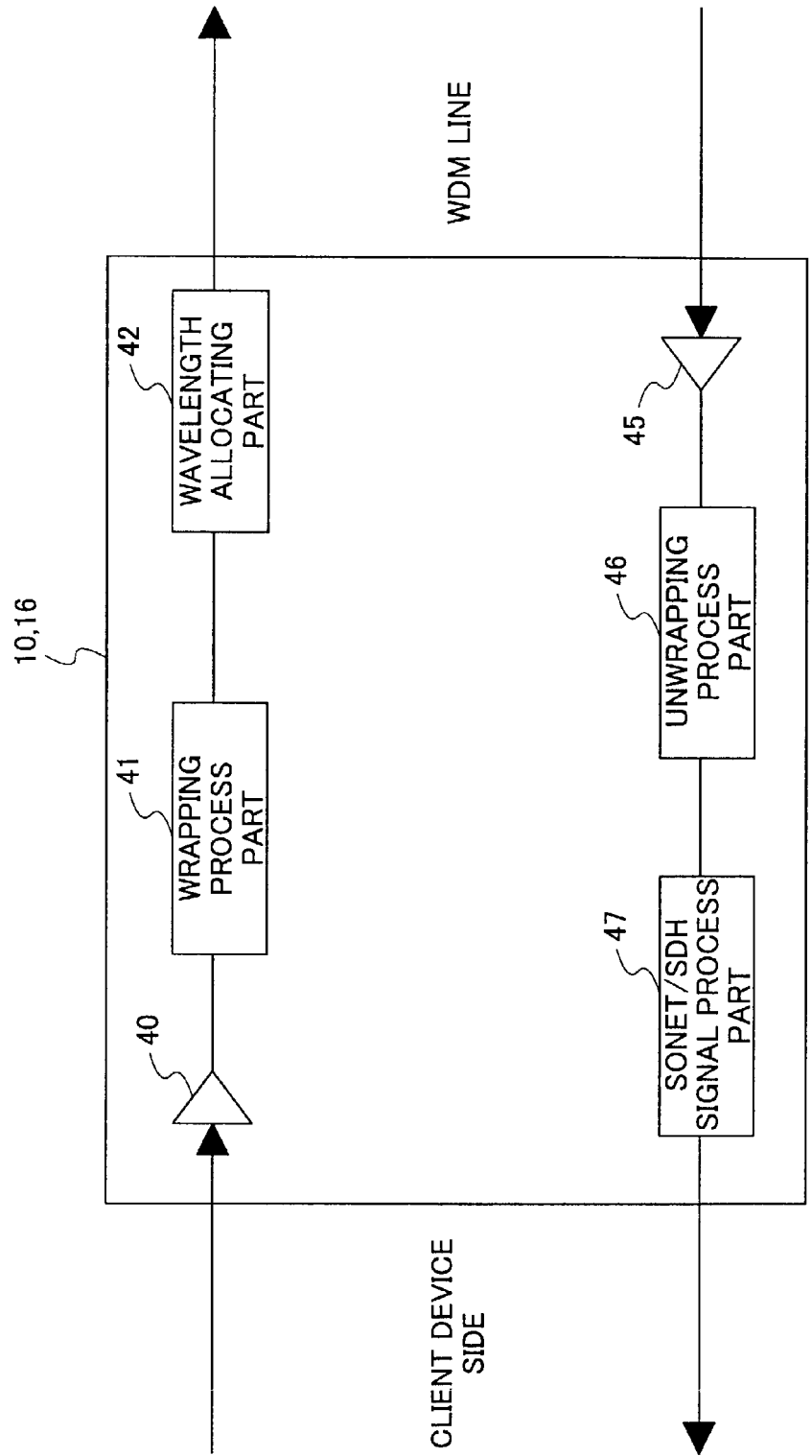
FIG. 4 is a block diagram of an example of a signal converting part of the related art.
Figure 5:
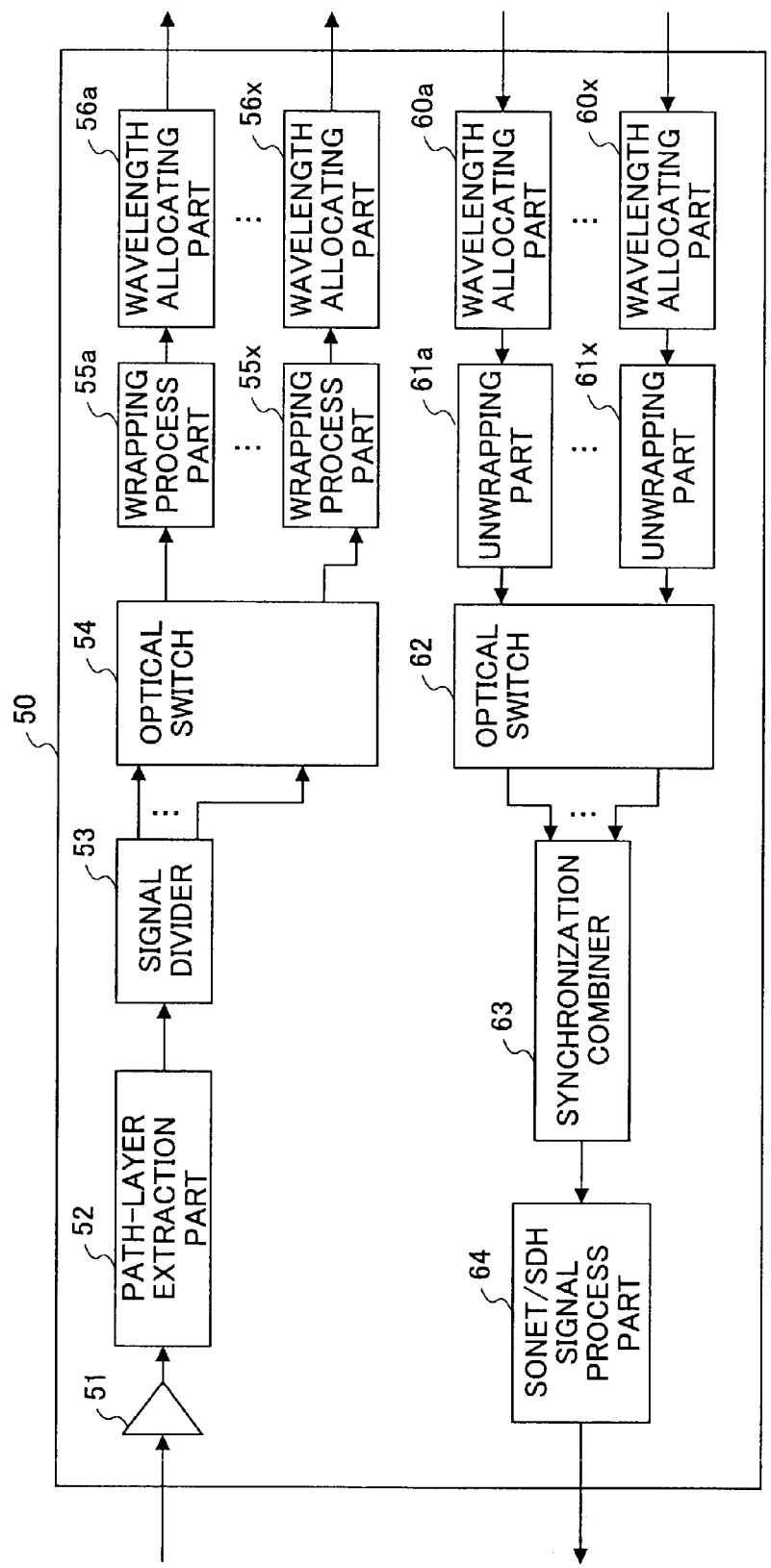
FIG. 5 is a block diagram of an example of a signal converting part of a WDM device of the present invention.

FIG. 5 is a block diagram showing an embodiment of a signal converting part 50 of a WDM device of the present invention. In the figure, a client signal of a SONET/SDH type is received at a signal receiving part 51 of the signal converting part 50 and a PATH layer of SONET/SDH is extracted at a PATH layer extracting part 52. The PATH layer of this client signal is supplied to a mapping part including a signal dividing part 53, an optical switch 54, wrapping process parts 55a–55x and wavelength allocating parts 56a–56x.

At the signal dividing part 53, the number of wavelengths required on the WDM line is determined by calculating bands-in-use using an SOH (Section Overhead) of the client signal. Then, the PATH layer of the client signal is divided into the thus-determined number of wavelengths. An optical switch 54 switches and cross-connects each portion of the divided PATH layer to each of wrapping process parts 55a–55x. Each of the wrapping process parts 55a–55x converts the respective portion of the divided PATH layer into a Digital Wrapper format or a format conforming to a wrapping technique defined by ITU-T G.709. In the wavelength determining parts 56a–56x, the wrapped signals are allocated to wavelengths that are unique within a WDM line and are output from the signal converting part 50. The output signals are wavelength-multiplexed in the downstream multiplexing part wherefrom the multiplexed signal is transmitted on the WDM line.

Wavelengths that are demultiplexed in the demultiplexer on the WDM line side are input into a mapping part including wavelength determining parts 60a–60x, unwrapping parts 61a–61x, an optical switch 62 and a synchronization combiner 63. The wavelengths that are demultiplexed in the demultiplexer on the WDM line side are input into wavelength determining parts 60a–60x, respectively, where each wavelength is converted into the same original wavelength. The signals having the same original wavelengths are unwrapped in unwrapping process parts 61a–61x so as to provide divided PATH layers. The divided PATH layers are cross-connected at an optical switch 62. The cross-connected signal is supplied to a synchronization combiner 63.

In the synchronization combiner 63, the PATH layers are synchronized and combined to reproduce a single client signal. The client signal is supplied to a SONET/SDH signal process part 64 wherefrom it is output as a client signal.

If an operator is to perform provisioning of the client signal up to the PATH layer, the provisioning operation is burdensome for the operator. Accordingly, communications to a client device is made using overhead in a client signal and communications to an opposing WDM device is made using an OSC (Optical Supervisory Channel) of the WDM line. In order to reserve wavelengths on demand, a GMPLS (Generalized-Multiprotocol Label Switching) architecture is used.

Figure 6:
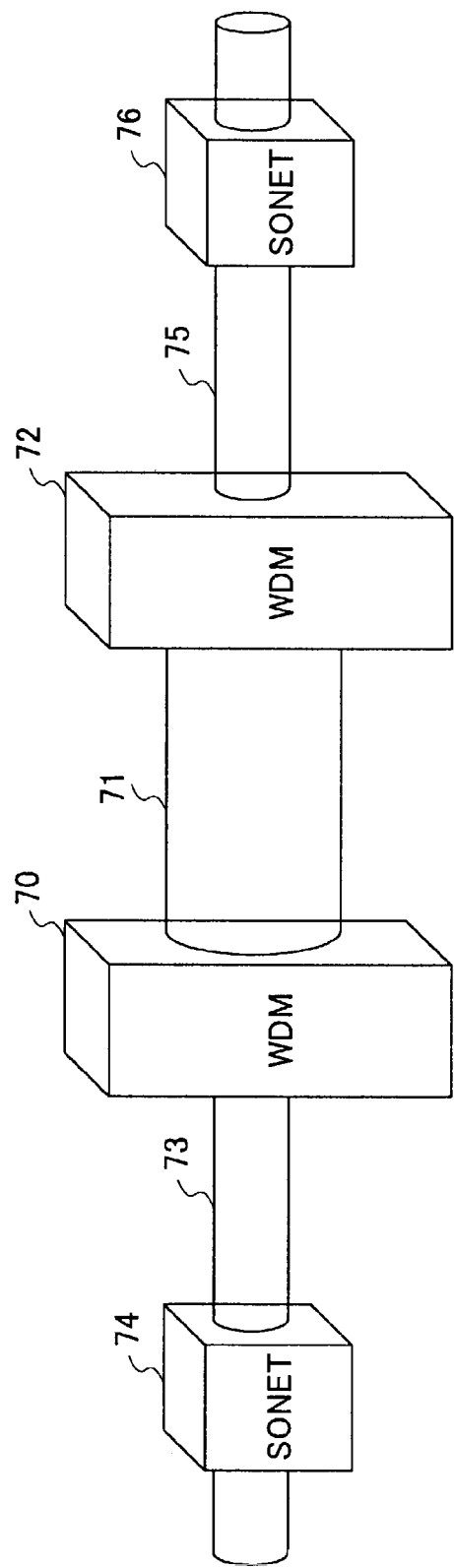
FIG. 6 is a system diagram of an embodiment of a WDM system according to the present invention.

FIG. 6 is a system diagram of an embodiment of a WDM system according to the present invention. The WDM devices 70 and 72 are capable of transmitting/receiving the signals to the WDM line 71 by allocating signals of fixed bands to wavelengths of the WDM line.

At the time of installation, the WDM devices 70 and 72 are provided with a device identifier (ID) and a WDM line identifier (ID). The WDM line identifier further includes information fields related to a fixed band to be carried on the wavelength, controllable wavelengths and a number of wavelengths and flags for indicating whether respective wavelengths are in use (default value is set to a value indicating that the wavelength is unused).

The WDM devices 70 and 72 are connected to SONET lines 73 and 75, respectively, via which client signals such as OC768 (40 Gbps) are transmitted. The SONET lines 73 and 75 are connected to SONET devices 74 and 76, respectively. TL-1 commands are used for provisioning facility information of the SONET devices 74 and 76.

FIGS. 7A and 7B show line identifiers (ID) that are set in the WDM devices 70 and 72 as a result of the provisioning operation. Each line identifier includes data related to its line band. Also, data indicating a number of wavelengths that this line can be divided into is provided from a management unit in which the facility information is entered. Further, each line identifier includes divided-wavelength in-use flags for each of the divided wavelengths (default value is set to a value indicating that the division wavelength is unused).

Figure 8:
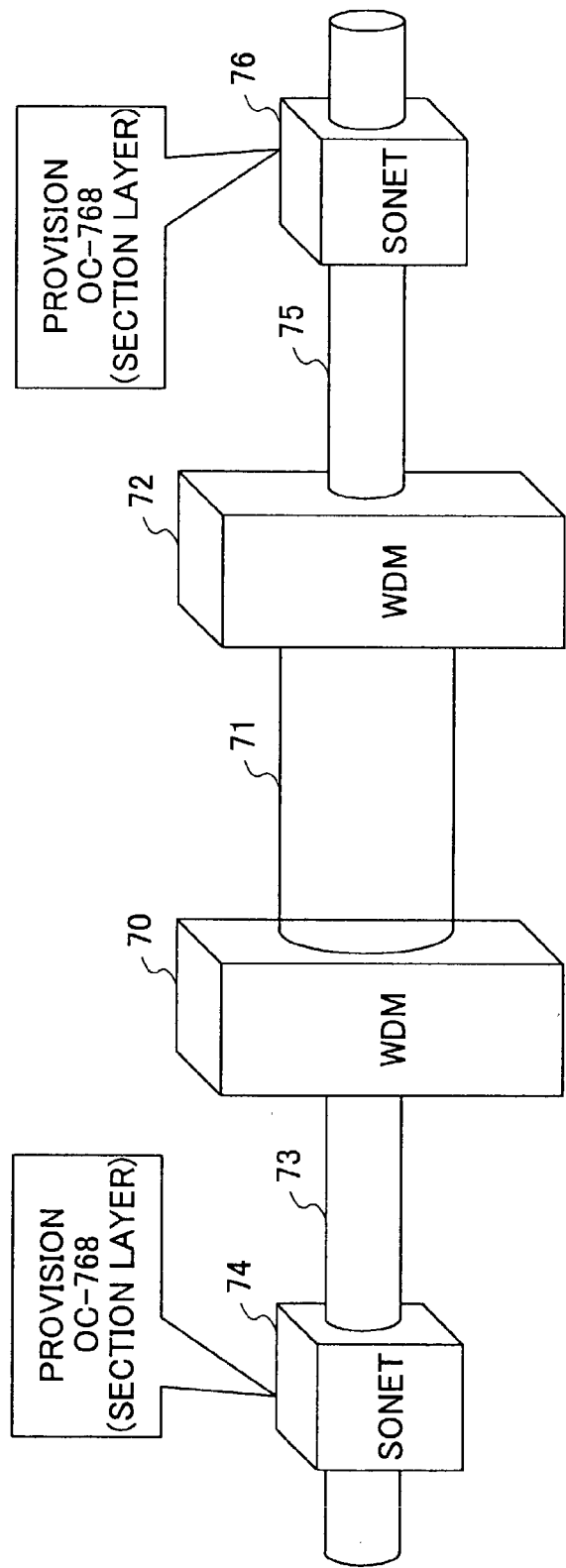
FIG. 8 is a diagram used for explaining a provisioning operation of the WDM device according to the present invention.
Figure 9:
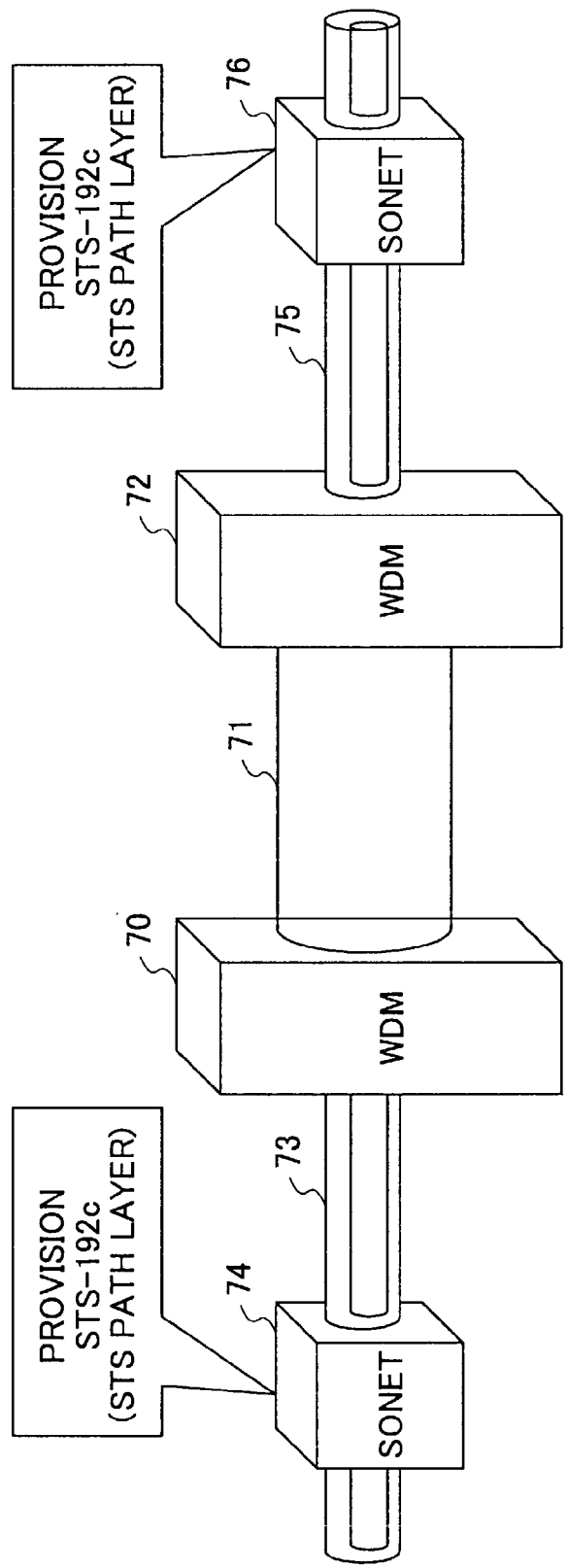
FIG. 9 is a diagram used for explaining a provisioning operation of the WDM device according to the present invention.

As shown in FIGS. 8 and 9, each of the WDM devices 70 and 72 performs an I/O setting operation up to a section/line layer. However, in the present invention, a provisioning operation to the wavelengths of the WDM line is not performed at this point.

In this embodiment, the SONET device 74, or the data client device, provides a path greater than 2.4 Gbps that can be mapped to wavelengths of the WDM line. The path provided by the SONET device 74 is provisioned to the WDM device 70.

Using a DCC (Data Communication Channel) that is in a SOH (Section Over Head), the SONET device 74 sends set-up information of the PATH layer to the WDM device 70. The set-up information includes a destination device identifier (ID) (in this example, SONET device 76), time slot number, and used band. The device identifier is uniquely given to each of the devices. One end of the layer is identified by a source device identifier and the other end of the layer is identified by a destination device identifier. It is to be noted that a "time slot number" is a term used for SONET/SDH. The used band can take a value between 0 to 40 Gbps.

The WDM device 70 starts a wavelength allocating process or the WDM line 71 based on set-up information of the PATH layer received from the SONET device 74.

Figure 10:
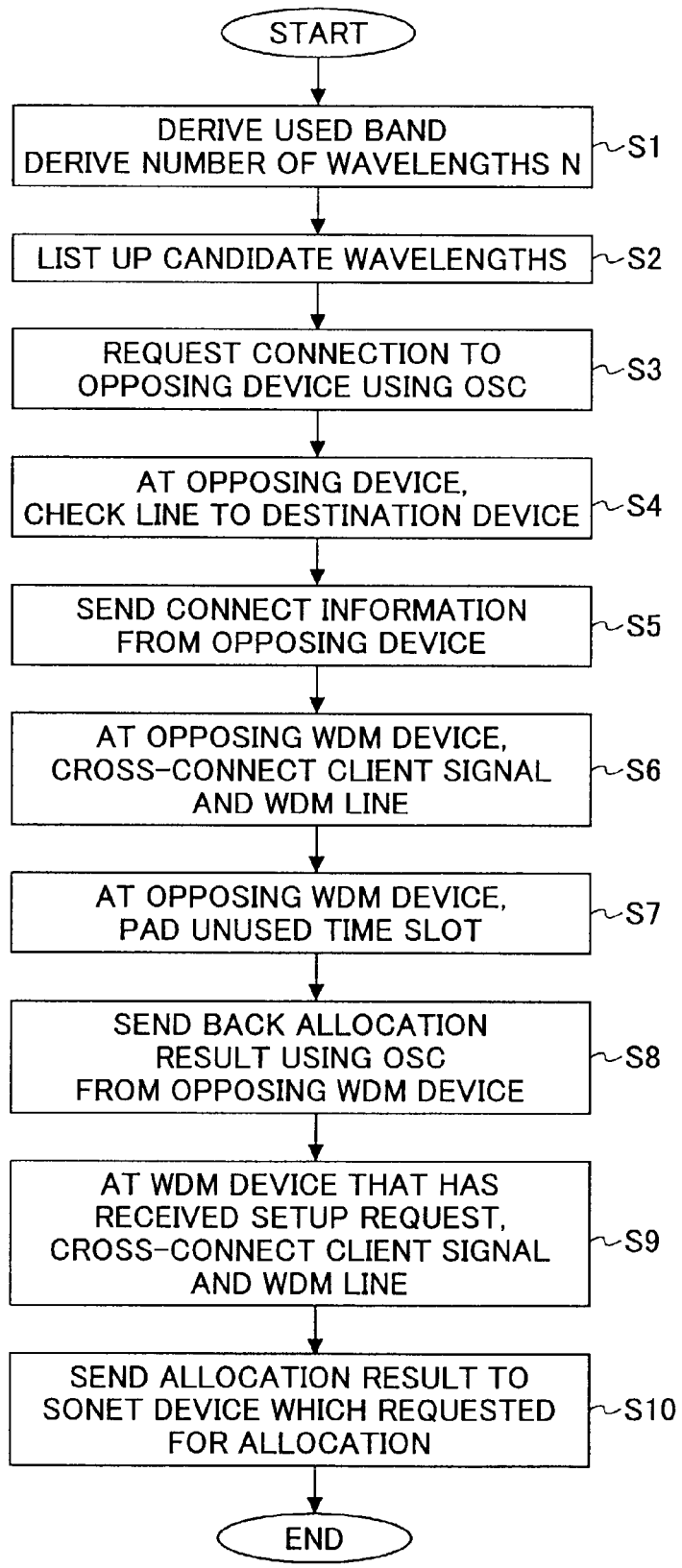
FIG. 10 is a flowchart showing an embodiment of a wavelength determining process performed by the WDM device of the present invention.
Figure 11:
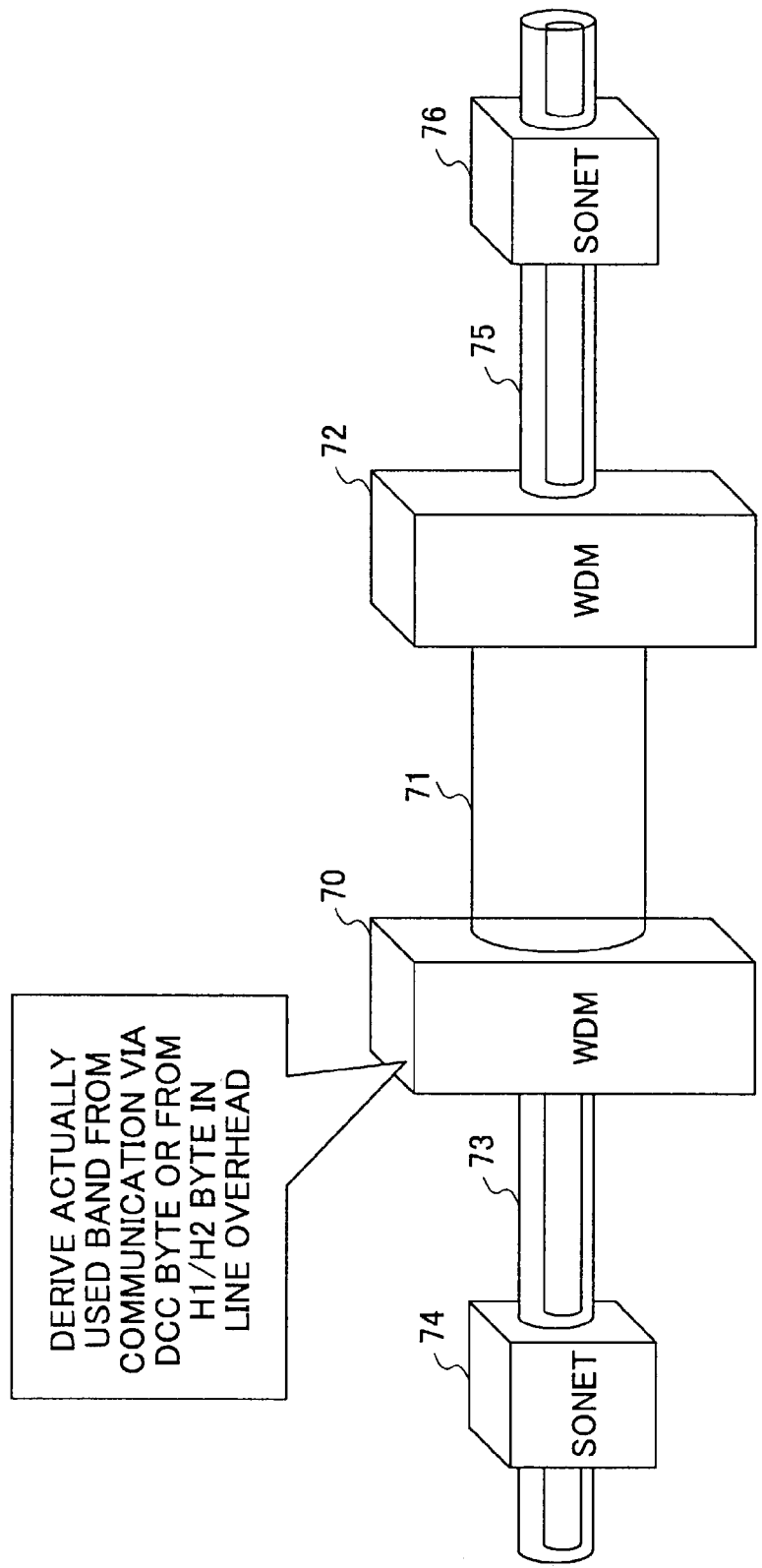
FIG. 11 is a diagram used for explaining how a provisioning operation is carried out in the WDM device.

FIG. 10 is a flowchart showing an embodiment of the wavelength setting process performed by the WDM devices 70 and 72. In step S1, the WDM device 70 derives a used band from the set-up information of the PATH layer using the DCC of the SOH or using the H1/H2 byte of the line overhead of the SOH. FIG. 11 shows this step. The derived used band is compared to the wavelength band of the WDM line 71 (in this example, 10.7 GB) to determine a value N, which is a value determined such that the used band is less than N-times the wavelength band. The value N is a number of wavelengths that need to be allocated to the client signal.

Figure 12:
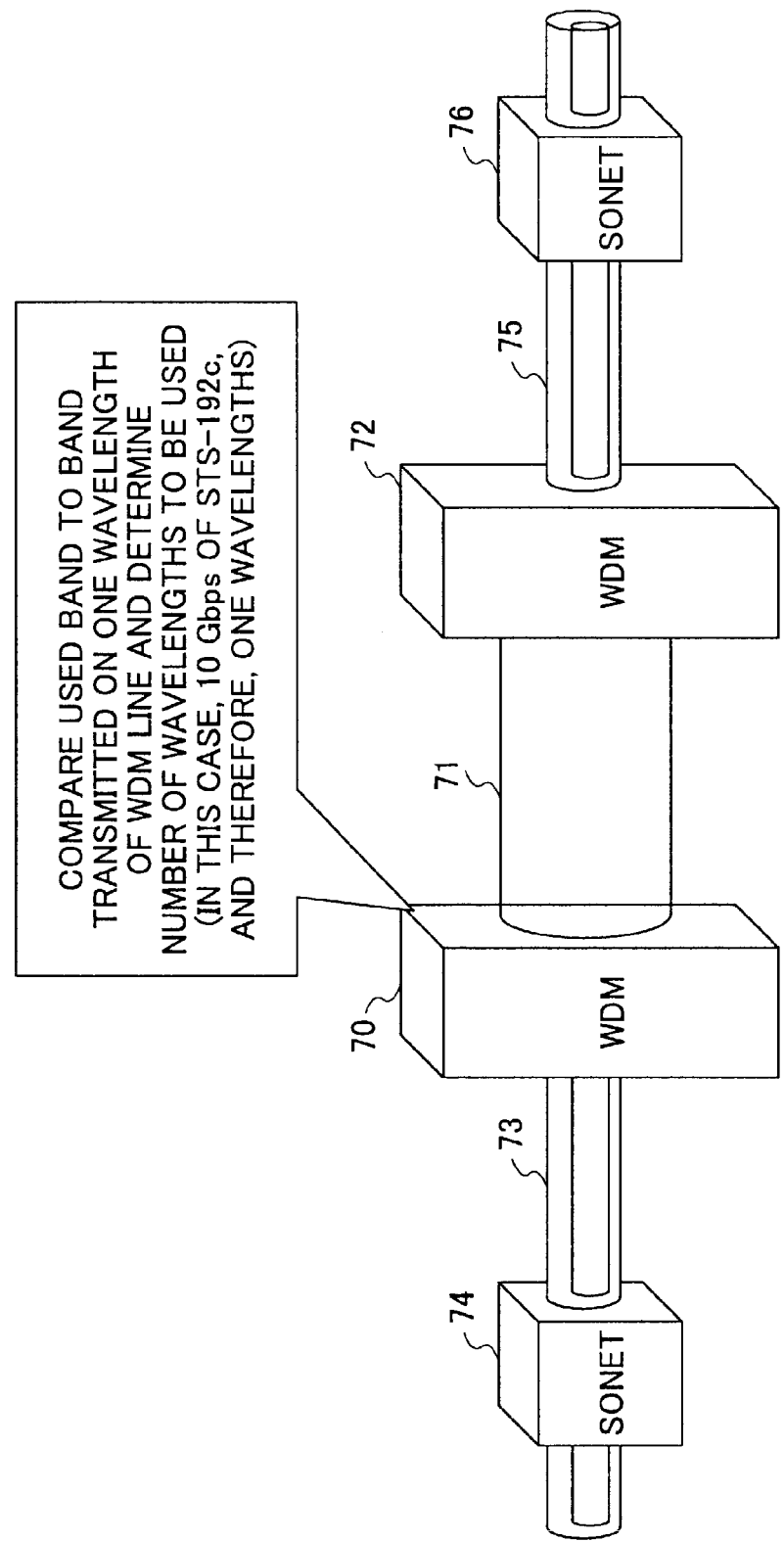
FIG. 12 is a diagram used for explaining how a provisioning operation is carried out in the WDM device.

For example, the number of wavelengths may be determined as "1" when the used band is 0–10 Gbps, "2" when the used band is 10–20 Gbps, "3" when the used band is 20–30 Gbps and "4" when the used band is 30–40 Gbps. FIG. 12 shows how the number of wavelengths is determined.

In step S2, if the derived number of wavelengths is less than the number of wavelengths provided in the WDM line, the WDM device 70 searches for unused wavelengths and lists up candidates. In order to take into account the wavelengths that are in use at an opposing device (in this example, the WDM device 72), the listed up number is to be greater than N.

Figure 13:
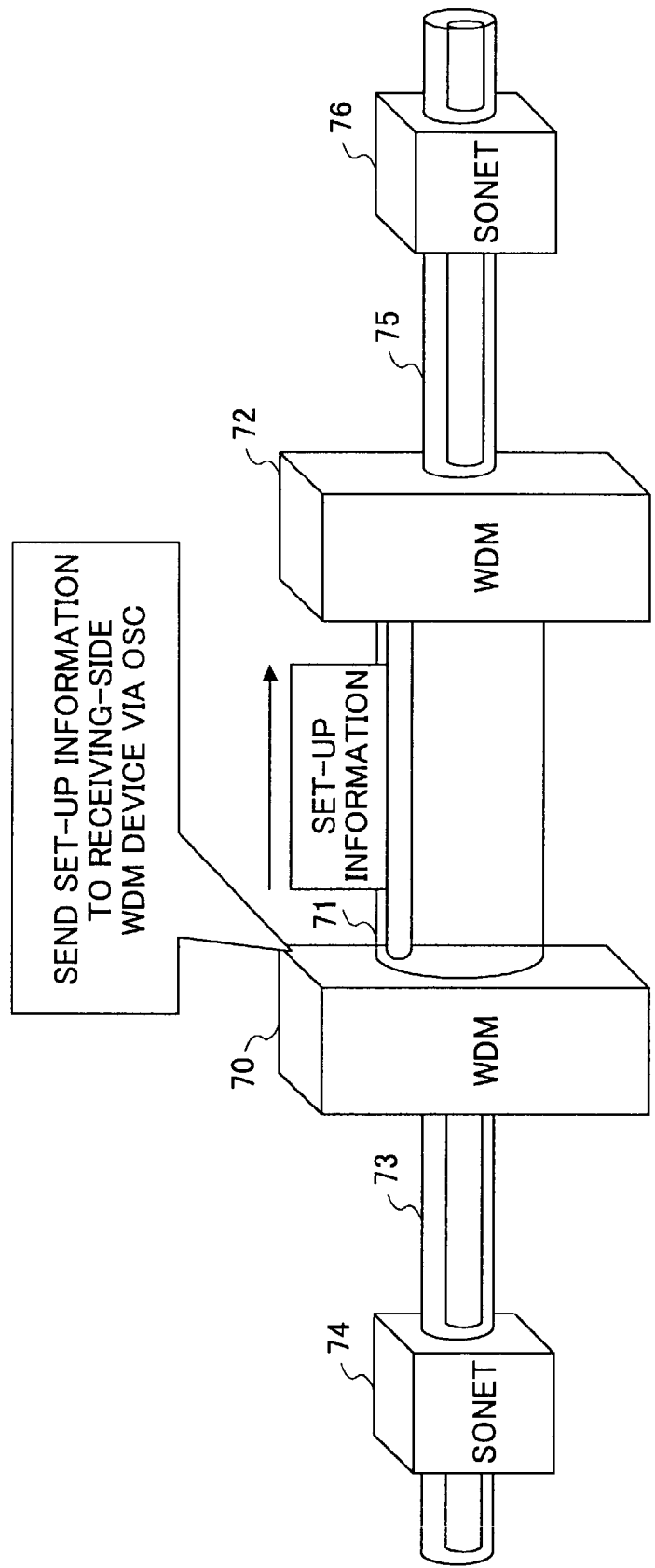
FIG. 13 is a diagram used for explaining how a provisioning operation is carried out in the WDM device.

In step S3, the WDM device 70 uses the destination device identifier to communicate with an opposing device (in this example, the WDM device 72) via an OSC (Optical Supervising Channel) which is a channel used for maintenance. The destination device identifier, timeslot number, the device identifier of the WDM device 70+client line identifier, an available wavelength list and required number of wavelengths are sent from the WDM device 70 to the WDM device 72. This is shown in FIG. 13. The client line identifier is a line identifier of the client before being divided into PATH layers. The candidates in the available wavelength list are reduced by the source device of the WDM line (in this case WDM device 70) as the process proceeds downstream from the WDM device 72 to the SONET device 76. Eventually, one available wavelength is determined.

Figure 14:
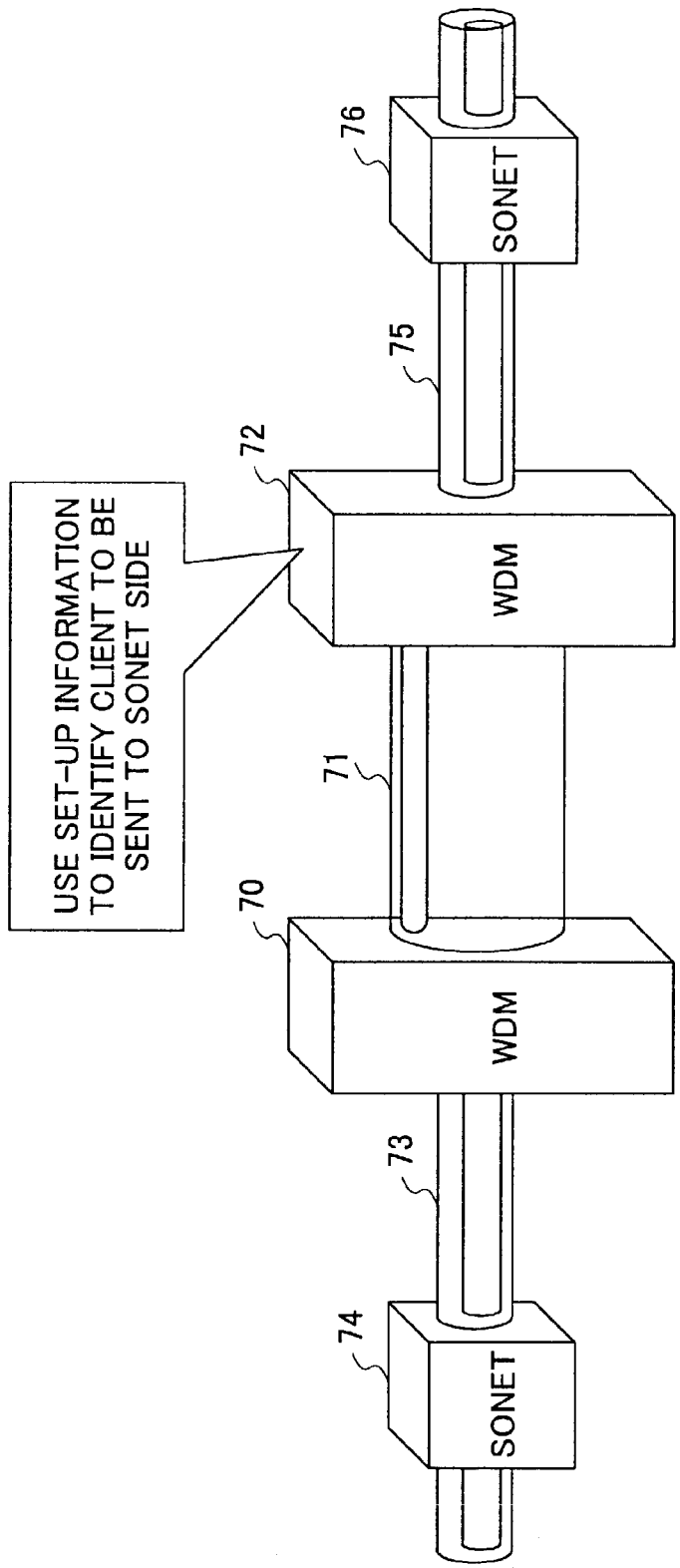
FIG. 14 is a diagram used for explaining how a provisioning operation is carried out in the WDM device.

In step S4, the WDM device 72 uses the destination device identifier to determine whether there is a line connected to the SONET device 76. This is shown in FIG. 14.

Figure 15:
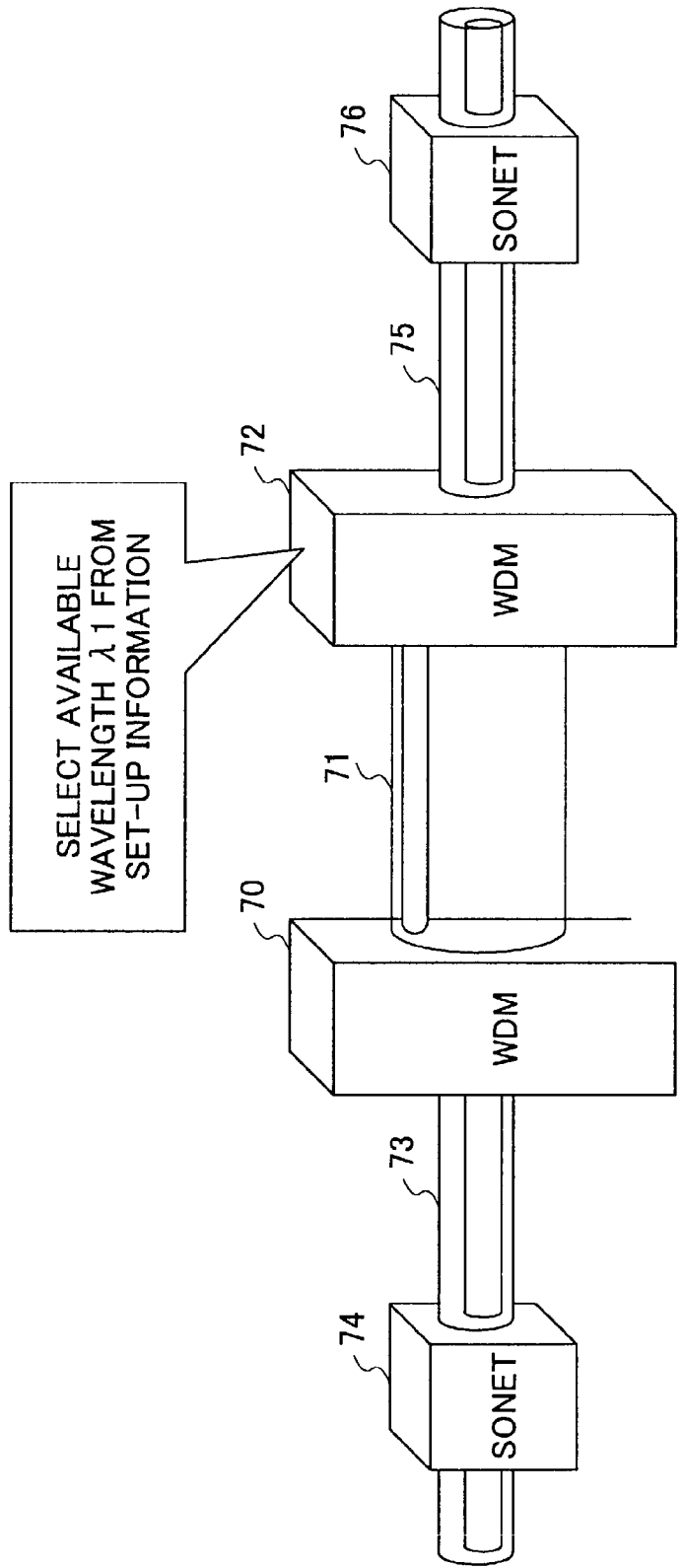
FIG. 15 is a diagram used for explaining how a provisioning operation is carried out in the WDM device.
Figure 16:
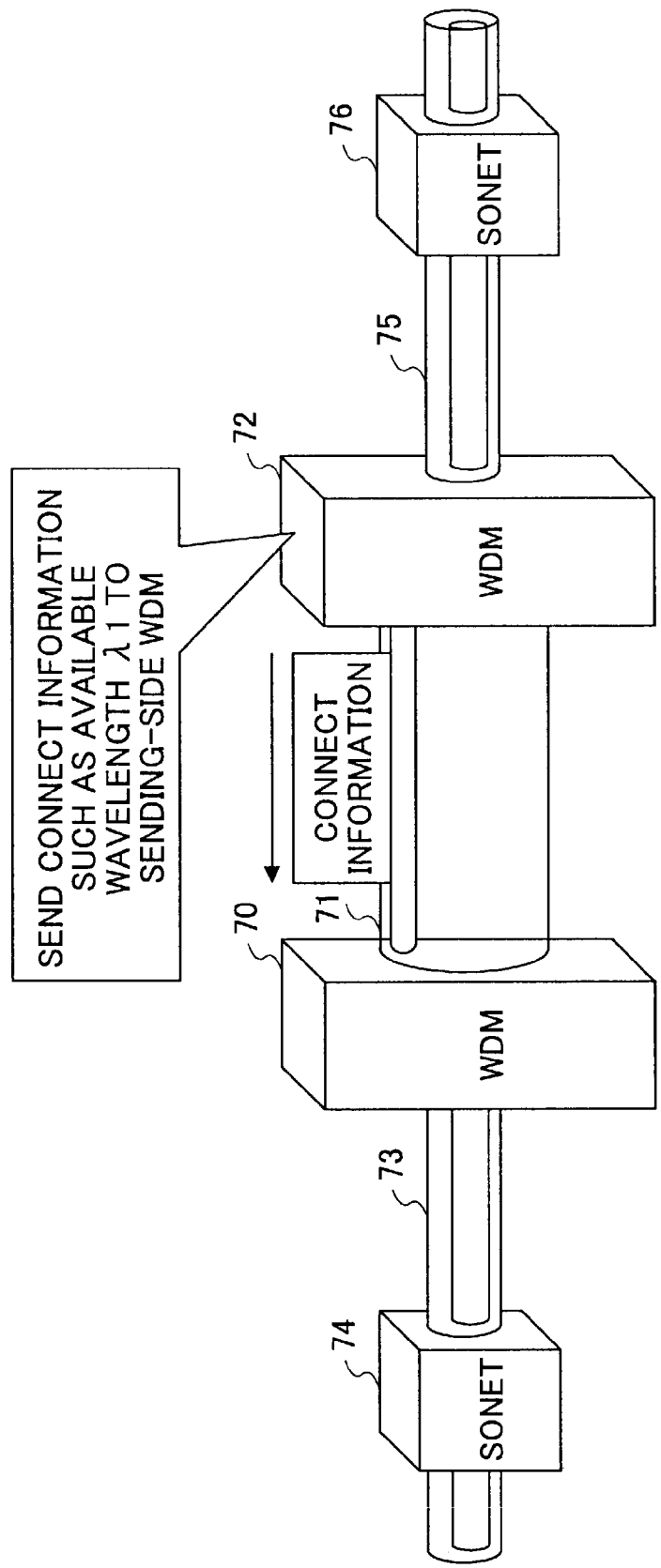
FIG. 16 is a diagram used for explaining how a provisioning operation is carried out in the WDM device.

In step S5, the WDM device 72 selects wavelengths that are unused in the WDM device 72 from the available wavelength list. The number of selected unused wavelengths corresponds to the number of wavelengths required. This is shown in FIG. 15. Then the WDM device 72 uses the OSC to send connect information to the WDM device 70. This is shown in FIG. 16.

In step S6, the WDM device 72 sets the in-use flag of the selected wavelength to a state showing that the wavelength is in-use. The I/O setting of wavelength settings is set and the client signal and the WDM line are cross-connected using an optical switch 54.

Figure 17:
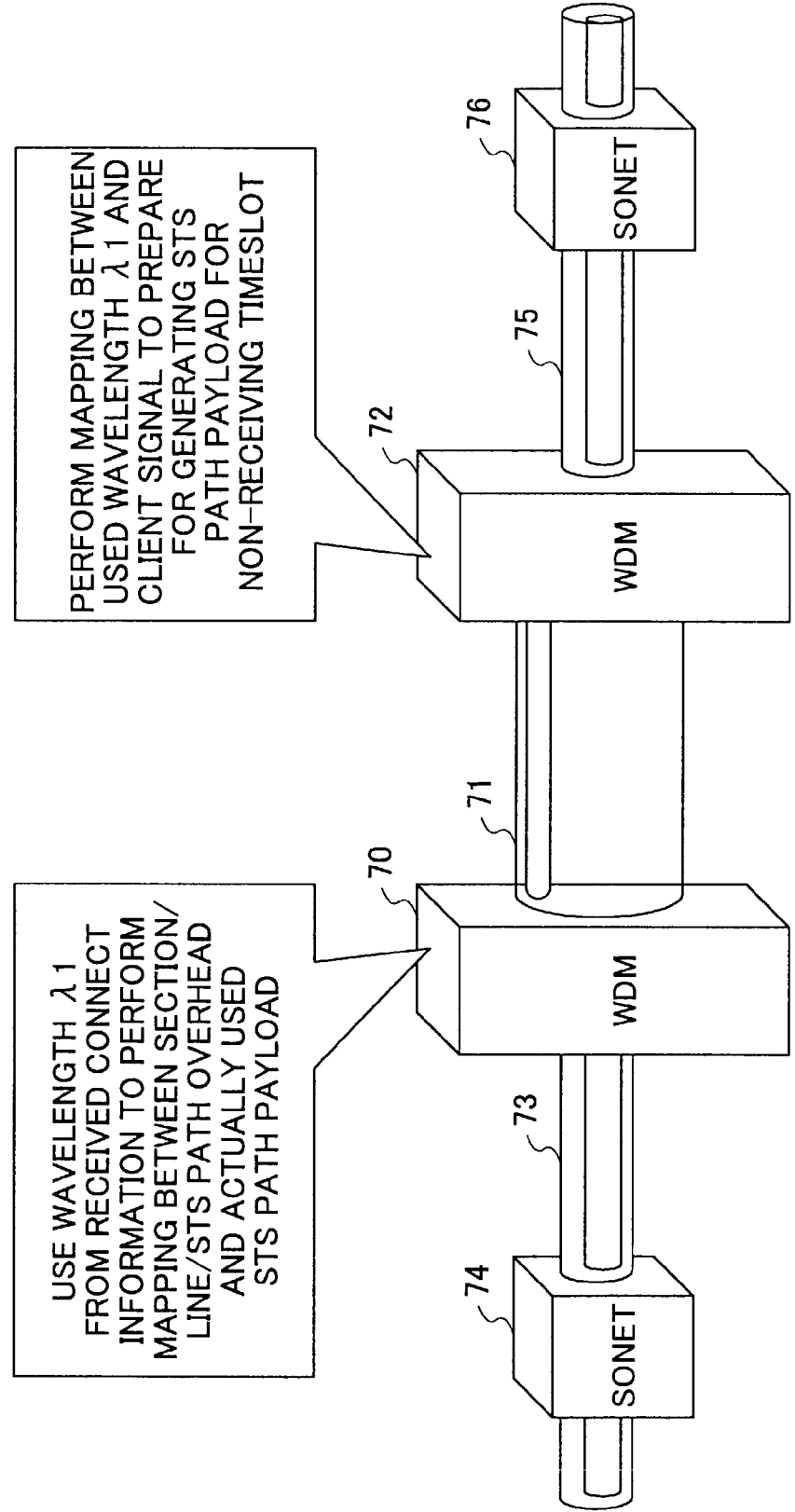
FIG. 17 is a diagram used for explaining how a provisioning operation is carried out in the WDM device.

In step S7, if the sum of the previously allocated band and the bands allocated in said steps S1–S6 is less than the line band on a SONET line 75 between the WDM device 72 and the SONET device 76, the WDM device 72 performs a padding on an unused time slot that is not receiving signals (inserts data of a predetermined pattern) such that the band of the unused time slot becomes the same as the line band. FIG. 17 is a diagram showing the above-mentioned steps S6 and S7.

In step S8, the WDM device 72 transmits the result of allocation to the WDM device 70 via the OSC of the WDM network. The allocation result includes the device identifier of the WDM device 72+the client line identifier and the allocation wavelength list.

In step S9, the WDM device 70 sets the in-use flag of the wavelength to an in-use state based on the allocation wavelength list The I/O setting of wavelength settings is set. Also, the client signal and the WDM lines are cross-connected.

In step S10, the WDM device 70 transmits the allocation result to the SONET device 74 via the DCC.

Figure 18:
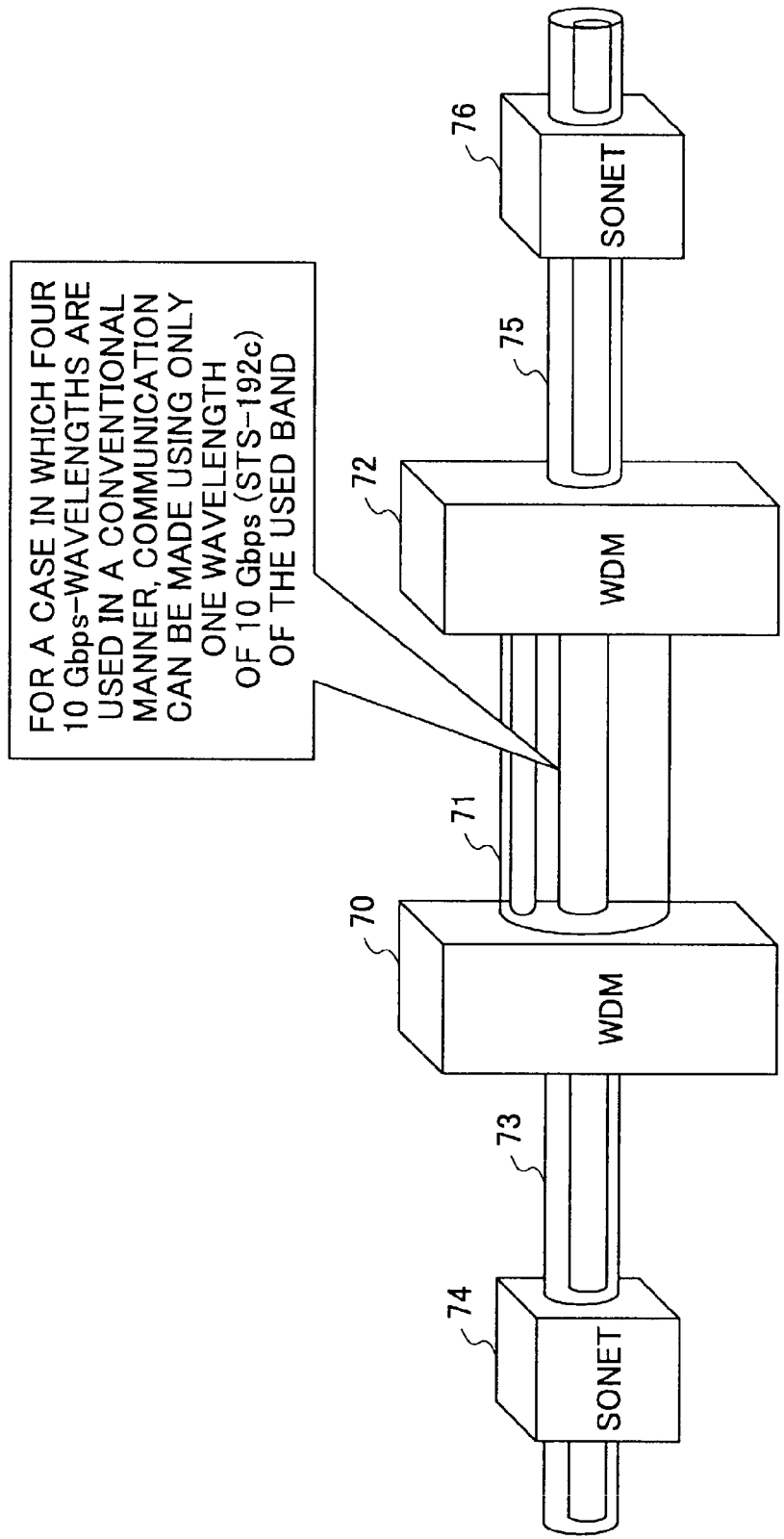
FIG. 18 is a diagram used for explaining how a provisioning operation is carried out in the WDM device.

Thus, as shown in FIG. 18, according to the present invention, a transmission that requires four wavelengths of 10 Gbps in the WDM line 71 in a conventional manner can be transmitted using only one wavelength of 10 Gbps (STS-192c). Therefore, the ratio of the used band against the wavelength can be optimized (minimized) and the number of wavelengths of the WDM line can be used in an efficient manner. As a result, usage fee of the WDM line can be reduced.

Referring to FIG. 19, a method of deriving the used band from an H1/H2 byte of a line overhead of the SOH will be described in detail. FIG. 19 is a diagram showing a frame format of the SOH in a synchronous transfer module STS-192c (OC-192) of SONET. The H1/H2 bytes (STS Payload Pointers) indicate positions of the STS path overheads. The number of pairs of the H1/H2 bytes correspond to the number of synchronous transfer module STS-1 paths that can be contained in the payload. The meanings of the H1/H2 byte bits are as follows. The first to fourth bits of the H1 byte represents a NDF (New Data Flag). The fifth and sixth bits of the H1 byte is normally "00" (undefined). The seventh and eighth bits of the H1 byte and all bits of the H2 byte are pointer values.

The NDF is "0110" in a normal state. However, when there is a change in the pointer value, it is inverted to "1001" and displayed in STS-1 units. For a continuous payload such as STS-192c, the H1/H2 byte which corresponds to the first STS-1 represents its normal meaning. However, the H1/H2 bytes corresponding to other STS-1 is "1001XX11 11111111", i.e., all of the pointer values becomes "1", and represents a different meaning.

Therefore, the number corresponding to STS-1 can be determined by adding the number of H1/H2 bytes that are performing a normal process and the number of H1/H2 bytes indicating continuity such as STS-192c. Further, the actually used band can be derived by multiplying the STS-1 band (52 Mbps).

Further, the present invention is not limited to these embodiments, and variations and modifications may be made without departing from the scope of the present invention.

The present application is based on Japanese priority application No. 2000-070515 filed on Mar. 14, 2002, the entire contents of which are hereby incorporated by reference.

What is claimed is:

1. A WDM (Wavelength Divisional Multiplex) device, wherein a client signal having a band that is greater than a band of a wavelength used for wavelength-division multiplexing is allocated to a plurality of wavelengths and is transmitted as a wavelength-division multiplexed signal, said WDM device comprising:
    a used-band detecting part for detecting a used-band that is used by said client signal supplied from a client device, said used-band being detected from a path layer of said client signal using set-up information contained in said path layer of said client signal;
    a wavelength number determining part for determining the number of the wavelengths used for the wavelength-division multiplexing from said detected used-band; and
    a mapping part for mapping said detected used-band onto the wavelengths used for the wavelength-division multiplexing.

2. A client device, wherein a client signal having a band that is greater than a band of a wavelength used for wavelength-division multiplexing is allocated to a plurality of wavelengths and is transmitted as a wavelength-division multiplexed signal, said client device being capable of supplying set-up information of a path layer of the client signal to a WDM (Wavelength Divisional Multiplex) device and instructing said WDM device to allocate the wavelengths to a client signal, wherein the number of the wavelengths is determined from a used-band that is used by said client signal and that is detected using the set-up information of the path layer of the client signal in said WDM device.

3. A network, wherein a client signal having a band that is greater than a band of a wavelength used for wavelength-division multiplexing is allocated to a plurality of wavelengths and is transmitted as a wavelength-division multiplexed signal, said network comprising:
    supplying means for supplying set-up information from a client device using a path layer of said client signal;
    mapping means for detecting, in a WDM (Wavelength Divisional Multiplex) device, a used-band that is used by said client signal supplied from the client device, said used-band being detected from the path layer of said client signal using the set-up information contained in said path layer of said client signal wherein the number of the wavelengths used for the wavelength-division multiplexing is determined from said detected used-band, and mapping said detected used-band onto the wavelengths used for wavelength-division multiplexing.

4. The WDM device as claimed in claim 1, wherein said mapping part further comprises:
    a dividing part for dividing said path layer of the client signal into said determined number of wavelengths;
    an optical switch part for cross-connecting said divided path layers;
    a plurality of wrapping parts for respectively wrapping said divided path layers that are cross-connected at said optical switch part; and a plurality of wavelength allocating parts for outputting signals obtained from said plurality of wrapping parts onto respective different wavelengths.

5. A WDM (Wavelength Divisional Multiplex) device, wherein a client signal having a band that is greater than a band of a wavelength used for wavelength-division multiplexing is allocated to a plurality of wavelengths and is transmitted as a wavelength-division multiplexed signal, said WDM device comprising:

a signal restoring part for synchronizing the plurality of wavelengths separated from a received wavelength-division multiplexed signal and restoring said received wavelength-division multiplexed signal into a path layer of the original client signal, wherein the number of the wavelengths is determined from a used-band that is used by said client signal and that is detected from a path layer of said client signal in a WDM device that transmits the wavelength-division multiplexed signal.

6. The WDM device as claimed in claim 5, further comprising:

a padding part for padding unused timeslots of said received wavelength-division multiplexed signal that do not receive any signal.

7. A system comprising a WDM (Wavelength Divisional Multiplex) device and a client device, wherein a client signal having a band that is greater than a band of a wavelength used for wavelength-division multiplexing is allocated to a plurality of wavelengths and is transmitted as a wavelength-division multiplexed signal, said system comprising a WDM device including:

a used-band detecting part for detecting a used-band that is used by the client signal supplied from the client device, said used-band being detected from a path layer of said client signal using set-up information contained in said path layer of said client signal;

a wavelength number determining part for determining the number of the wavelengths used for the wavelength-division multiplexing from said detected used-band; and a mapping part for mapping said detected used-band onto the wavelengths used for wavelength-division multiplexing.

8. The system as claimed in claim 7, wherein said client device is capable of supplying said set-up information of said path layer of the client signal to said WDM (Wavelength Divisional Multiplex) device and instructing said WDM device to allocate the wavelengths to the client signal.

9. The system as claimed in claim 8, wherein said mapping part of said WDM device further comprises:

a dividing part for dividing said path layer of the client signal into said determined number of wavelengths;
an optical switch part for cross-connecting said divided path layers;
a plurality of wrapping parts for respectively wrapping said divided path layers that are cross-connected at said optical switch part; and
a plurality of wavelengths allocating parts for outputting signals obtained from said plurality of wrapping parts onto respective different wavelengths.

10. The system as claimed in claim 8, wherein said WDM device further comprises:

a signal restoring part for synchronizing the plurality of wavelengths separated from a received wavelength-division multiplexed signal and restoring said received wavelength-division multiplexed signal into the path layer of the original client signal.

11. The system as claimed in claim 10, wherein said WDM device further comprises:

a padding part for padding unused timeslots of said received wavelength-division multiplexed signal that do not receive any signal.

12. A method of allocating a client signal having a band that is greater than a band of a wavelength used for wavelength-division multiplexing to a plurality of wavelengths and is transmitted as a wavelength-division multiplexed signal, said method comprising the steps of:

detecting a used-band that is used by a client signal supplied from a client device, said used-band being detected from a path layer of said client signal using set-up information contained in said path layer of said client signal;

determining the number of the wavelengths used for wavelength-division multiplexing from said detected used-band; and mapping said detected used-band onto the wavelengths used for wavelength-division multiplexing.

13. A method of allocating a client signal having a band that is greater than a band of a wavelength used for wavelength-division multiplexing to a plurality of wavelengths and is transmitted as a wavelength-division multiplexed signal, said method comprising the steps of:

supplying set-up information of a path layer of the client signal from a client device to a WDM (Wavelength Divisional Multiplex) device; and instructing from said client device to said WDM device to allocate the wavelengths to the client signal, wherein the number of the wavelengths is determined from a used-band that is used by said client signal and that is detected using the set-up information of the path layer of the client signal in said WDM device.

14. The method as claimed in claim 12, wherein said mapping step further comprises the steps of:

dividing said path layer of the client signal into said determined number of wavelengths;
cross-connecting said divided path layers;
wrapping said divided path layers that are cross-connected at an optical switch part; and
outputting signals obtained from said plurality of wrapping parts onto respective different wavelengths.

15. A method of allocating a client signal having a band that is greater than a band of a wavelength used for wavelength-division multiplexing to a plurality of wavelengths and is transmitted as a wavelength-division multiplexed signal, said method comprising the steps of:

synchronizing the plurality of wavelengths separated from a received wavelength-division multiplexed signal; and restoring said wavelength-division multiplexed signal into a path layer of the original client signal, wherein the number of the wavelengths is determined from a used-band that is used by said client signal and that is detected from a path layer of said client signal in a WDM device that transmits the wavelength-division multiplexed signal.

16. The method as claimed in claim 15, further comprising the step of:

padding unused timeslots of said received wavelength-division multiplexed signal that do not receive any signal.

* * * * *